Aug. 27, 1935.  J. H. HERZOG  2,012,814
WIPER FOR TRANSPARENT BODIES
Filed Dec. 9, 1932
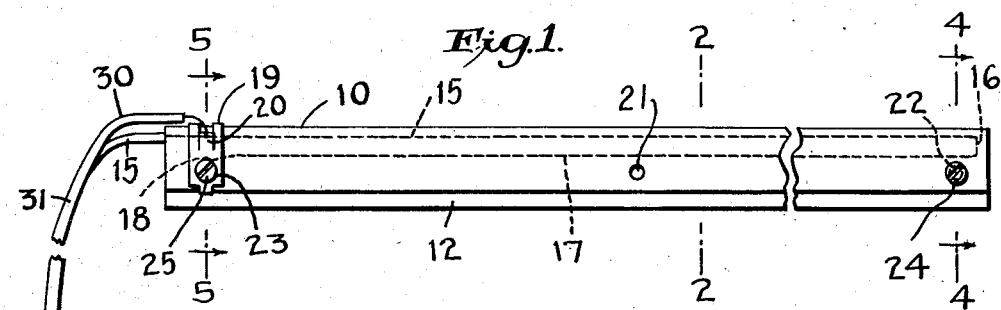
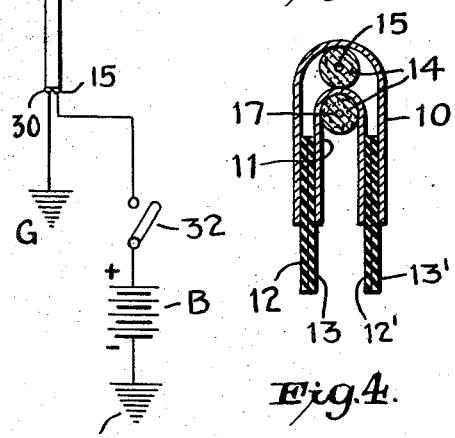
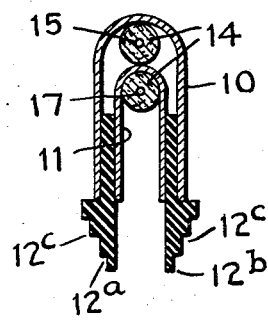
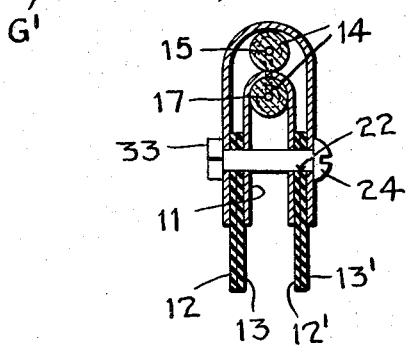
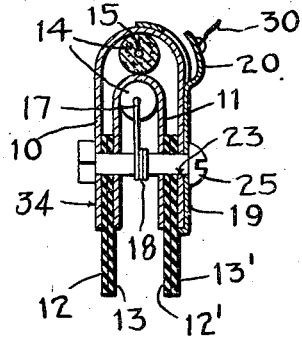
INVENTOR
John H. Herzog
BY
ATTORNEY Patented Aug. 27, 1935

2,012,814

UNITED STATES PATENT OFFICE 2,012,814

WIPER FOR TRANSPARENT BODIES

John H. Herzog, Laurelton, N. Y.

Application December 9, 1932, Serial No. 646,365

4 Claims. (Cl. 15—250)

The present invention has to do with squeegees for transparent bodies, and is particularly directed to windshield wipers for automobiles, locomotives, and other vehicles.

In cold wet weather it has heretofore been a source of great annoyance to drivers of vehicles to have rain, sleet or snow drive against the windshield and freeze thereon in an irregular translucent film, thus obscuring the vision of the driver. Under certain weather conditions it has been found also that fog, which is composed of very small water particles suspended in air, will also cause a frozen film to be deposited on the windshield. In order to remove ordinary raindrops and vapor films from windshields, many types of wipers have been developed. The most satisfactory kind of wiper has proved to be that type which functions as a squeegee; but when the water on a windshield, either in the form of droplets or in the form of a sheet, is frozen, the ordinary windshield wiper cannot dislodge it and either passes over it or is held from movement by virtue of being stuck in the ice film.

The present invention overcomes these difficulties and provides a squeegee for transparent bodies which is efficiently operable even though the water on the glass or windshield is frozen hard.

Briefly described, the invention comprises the provision of a heating unit in or adjacent a windshield wiper, which is constructed in a novel and extremely simple manner, in order that this purpose may be successfully achieved.

In the drawing, Fig. 1 is a side elevation of a windshield wiper in which the principles of the present invention have been embodied; Fig. 2 is a section along line 2—2 of Fig. 1; Fig. 3 is a sectional view similar to that of Fig. 2 but of a modified form of the invention; Fig. 4 is a section along line 4—4 of Fig. 1; and Fig. 5 is a section along line 5—5 of Fig. 1.

A metallic cover or shield 10, preferably of relatively non-corrosive metal, such as nichrome zinc, is bent in a substantially U-shaped form as shown in Fig. 2. A smaller metallic member 11 is similarly shaped and placed inside the cover 10. Between the side faces of the covers are placed relatively thin pieces of soft vulcanized rubber 12, 13 and 12', 13'. In the space between the inner cover and the outer cover is led resistance wire 15, preferably of an alloy, such as one made of nickel and chromium, which is suitable for use as an electrical heating unit. The wire is turned at 16 about the edge of the inner cover 11 and led back as at 17 through the channel formed on the inside of the member 11, and attached as at 18 to the connecting member 25 hereinafter to be described.

Through the members 10 and 11 and also through the rubber squeegee members 12, 13 and 12', 13', are cut openings 21, 22 and 23. The openings 22 and 23 are arranged to receive connecting members 24 and 25 which may consist of an ordinary bolt threaded at the end to receive a nut. This construction is apparent from an inspection of Figs. 1, 4, and 5. In Fig. 5 is indicated the manner in which the resistance wire 17 may be terminally secured to the connecting member 25 by winding it therearound. It is to be understood that the assembly is held securely together by tightening up on the connecting members 24 and 25 and the wiper members 12, 13, 12', and 13' may be readily replaced by the construction described.

The resistance wire 15 is preferably covered with a light layer of insulating material, such as asbestos, throughout its entire length in order that the heat generated by inducing a current through this wire may be kept within reasonable limits and so that short circuiting may be prevented. The insulation is illustrated in the sectional views at 14 and this insulation serves not only to dampen the effect of the hot resistance wire 15 but also serves to keep it in place and insulated from displacement or rupture from shock. Of course, the extensions 16 and 17 of wire 15 are constructed similarly.

To one end of the wiper member 10 may be secured a metallic contact post 19, preferably shaped as indicated in Figs. 1 and 5, and provided with an aperture through which the connecting means 25 may be inserted in order to securely attach the member 19 to the outside of the shield 10. Member 19 is preferably struck up as at 20 in order to provide an accessible prong upon which a connecting wire 30 may be soldered or otherwise attached. The wire 30, suitably insulated, is wound into extension 31 and grounded as at G at any suitable point on the automobile or other vehicle. The wire 15, also suitably insulated, is wound into extension 31 and led to the positive pole of the storage battery B, the negative pole of which is grounded as at G' in the customary manner. A suitable switch 32 is interposed in the circuit in order to enable the heating circuit to be energized.

Into the opening 21 is inserted a pin (not shown) which connects the windshield wiper to the arm of any suitable activating device.

When it is desired to prevent the formation of ice on the windshield or to cleanse a transparent surface to which a layer of ice has already become adhered, the switch 32 is thrown in and the circuit energized. The wire 15, by virtue of its resistance, quickly becomes heated throughout its length 15, 16, 17, and the heat generated is communicated to the shells 10 and 11, warming the atmosphere in the vicinity thereof. The resistance of the wire 15 is, of course, chosen so that sufficient heat will be generated to radiate a considerable distance away from the windshield wiper, and so that a film of ice on the windshield is quickly melted and prevented from thereafter forming. The heat from the lower course 17 of the heating unit is reflected by the inner surface of the shell 11 and directed at the area upon which the wiper members contact, while the upper course 15 not only serves as an additional source of heat for conduction, radiation and convection to the other parts of the device but also serves as a "buffer" to facilitate the retention and distribution of heat by the lower course 17 and to prevent the latter from being cooled to too great an extent during extremely low temperatures. It should be noted that the heating unit is operable independently of the means which actuates the windshield wiper, and the wiper may be operated in warm weather regardless of whether the switch 32 is thrown in or out.

In Fig. 3 illustrated a modification in which the squeegee members 12ª and 12ᵇ are constructed of molded pieces of rubber, the outside surfaces of which are stepped as indicated at 12ᶜ in order to provide a plurality of points at which the rubber will contact with the glass or other transparent body. In this manner a more efficient wiping action is assured.

With the construction above described, it is apparent that the formation of ice on the windshield or other transparent body is effectively prevented, and that danger of accident due to the obscured vision of the driver of a vehicle is prevented. It should, of course, be understood that the invention has been described with respect to an exemplary embodiment only, and that it may be adapted for use in standard types of windshield wipers by little, if any, change in design. However, the novel construction described is particularly efficacious in utilizing the principles of the invention, as the resistance wires are held securely in place and prevented from being jarred loose and short circuiting.

What I claim is:

1. A wiper for the surfaces of transparent bodies comprising, in combination, two interfitting shell members adapted to clamp squeegee members between them, means co-operating with said members to hold the same in spaced relationship, and electrical resistance units arranged longitudinally of and within each of said shell members at the bends thereof, one unit being located between the same, said units being adapted to give off heat upon the passage of an electrical current therethrough.

2. A wiper for the surfaces of transparent bodies comprising, in combination, two interfitting shell members adapted to clamp squeegee members between them, means co-operating with said members to hold the same in spaced relationship, and electrical resistance units arranged longitudinally of and within each of said shell members at the bends thereof, one unit being located between the same, said units being adapted to give off heat upon the passage of an electrical current therethrough, at least one of said shell members being arranged to reflect said heat toward the surface to be acted upon.

3. A wiper for the surface of a body comprising, in combination, a substantially U-shaped metallic cover, a similarly shaped but smaller member positioned within the cover and having its ends terminating adjacent the ends of said cover, squeegee members secured between the adjacent side faces of said U-shaped members, means co-operating with said members to hold the same in spaced relationship, resistance wires within the bends of each U-shaped member and electrically insulated therefrom one of said wires being located between the same, said wires being connected into an electrical circuit, and being adapted upon energization of said circuit to become heated and to warm the air adjacent the surface of said body, the smaller U-shaped member being adapted to reflect heat in an unobstructed path toward the surface to be wiped.

4. A wiper for the surface of a body comprising, in combination, means including a pair of U-shaped channel members disposed one within the other in spaced relationship, wiping members secured between the side faces of said U-shaped members, electrical heating means separated into courses, each of which is located within the separate bends and extends throughout the length of each U-shaped member, one of said U-shaped members being adapted to direct heat from said heating means directly against the surface of the body to be wiped.

JOHN H. HERZOG.